United States Patent
Shen

(10) Patent No.: US 6,870,324 B2
(45) Date of Patent: Mar. 22, 2005

(54) METHOD FOR COLOR MIXING WITH ARC STABILITY AND STRAIGHTENING OF HID LAMPS OPERATED AT HIGH FREQUENCIES USING DUTY CYCLE MODULATION

(75) Inventor: Eric Shen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 609 days.

(21) Appl. No.: 09/930,730

(22) Filed: Aug. 15, 2001

(65) Prior Publication Data

US 2004/0070352 A1 Apr. 15, 2004

(51) Int. Cl.[7] .............................................. H05B 37/02
(52) U.S. Cl. ........................ 315/223; 315/224; 315/246
(58) Field of Search ................................. 315/246, 224, 315/223

(56) References Cited

U.S. PATENT DOCUMENTS

| 4,373,146 | A | * | 2/1983 | Bonazoli et al. | ......... 315/209 R |
| 6,184,633 | B1 | | 2/2001 | Kramer | ....................... 315/246 |
| 6,498,441 | B1 | * | 12/2002 | Shen | ........................... 315/291 |

* cited by examiner

Primary Examiner—David Vu

(57) ABSTRACT

A method of color mixing with arc stability and arc straightening of HID lamps operated at high frequencies which modulates a duty cycle of a half bridge configured resonant inverter at a frequency which is substantially one-half the frequency of a second longitudinal acoustic mode of the HID lamp. The method also sweeps the switching frequency in a high frequency range of such resonant inverter. The duty cycle modulation effectuates power modulation to create a fixed frequency power component which is substantially equal to the frequency of the second longitudinal acoustic mode. The sweeping switching frequency of the half bridge configured resonant inverter drives the HID lamp in a manner which effectuates arc stability and arc straightening.

17 Claims, 2 Drawing Sheets

METHOD FOR COLOR MIXING WITH ARC STABILITY AND STRAIGHTENING OF HID LAMPS OPERATED AT HIGH FREQUENCIES USING DUTY CYCLE MODULATION

FIELD OF THE INVENTION

This invention relates to methods for reducing vertical segregation in high intensity discharge (HID) lamps, and more particularly, to a method for color mixing with arc stability and arc straightening of HID lamps operated at high frequencies which employs duty cycle modulation in combination with sweeping switching frequency in a high frequency range for operation of a half bridge configured resonant inverter.

BACKGROUND OF THE INVENTION

When certain high intensity discharge (HID) lamps are operated in a vertical orientation, the lamps display a phenomenon called vertical segregation. Vertical segregation is identified by a non-uniform color of light emitted from the discharge along the vertical axis. More specifically, the color of the HID lamp varies from the top to the bottom. Vertical segregation is caused by gravity creating a non-uniform distribution of chemistry in the lamp. Simply put, a majority of the chemistry is located at the bottom of the arc rather than being evenly distributed throughout the arc.

In one attempt to overcome the disadvantage of vertical segregation, the second longitudinal acoustic mode was excited. When the second longitudinal acoustic mode was excited, the chemistry in the lamp was mixed, which yielded a uniform color along the vertical axis of the HID lamp. In other words, the vertical segregation was reduced. Furthermore, it has been demonstrated that driving the HID lamp at a high frequency which was swept from 45 Hz to 55 kHz at a slow rate (for example, 100 Hz) provided arc stability and arc straightening.

In another attempt, a full bridge configured resonant inverter was operated at a high frequency (for example, 250 kHz) in order to synthesize an amplitude modulated 45 kHz to 55 kHz sinusoidal waveform through the use of pulse width modulation (PWM) techniques. The amplitude modulated waveform generated the second longitudinal acoustic mode excitation used for color mixing or reducing vertical segregation. The required high frequency switching and the PWM operation makes the implementation inefficient since the circuit power losses are very high.

SUMMARY OF THE INVENTION

The present invention contemplates a method of color mixing with arc stability and arc straightening of HID lamps operated at high frequencies which employs duty cycle modulation in combination with sweeping switching frequency in a high frequency range for operation of a half bridge configured resonant inverter. The duty cycle modulation effectuates power modulation to create a fixed frequency power component which is substantially equal to the frequency of the second longitudinal acoustic mode. The sweeping switching frequency drives the HID lamp in a manner which effectuates arc stability and arc straightening.

DETAILED DESCRIPTION OF THE INVENTION

Figure 1:
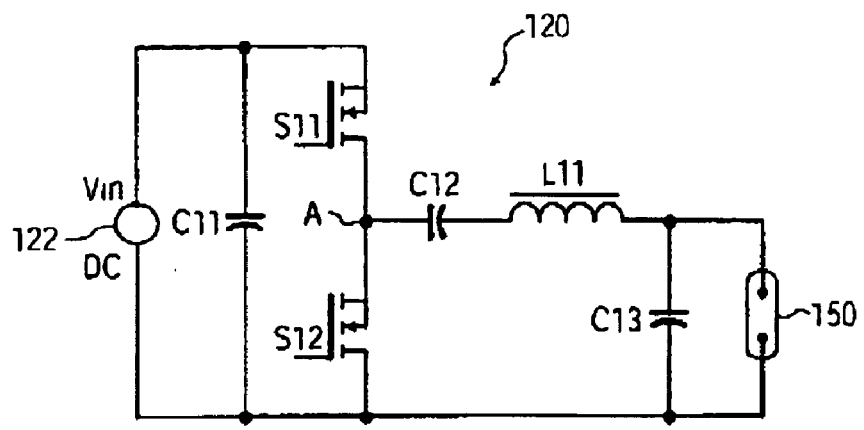
FIG. 1 illustrates a schematic diagram of a conventional resonant inverter.

Referring now to FIG. 1, the schematic diagram of the conventional half bridge configured resonant inverter 120 is shown. The present invention employs a conventional half bridge configured resonant inverter 120 coupled to a high intensity discharge (HID) lamp 150 to carry out the method of the present invention to achieve color mixing by excitation of the second longitudinal acoustic mode. The resonant inverter 120 includes a half bridge circuit with two transistors or switches S11 and S12, which are complementarily switched or driven with a swept high frequency range having, preferably, a nominal high frequency of 50 kHz with a nominal duty cycle (the amount of time a switch is on) of 50% or 0.5.

Referring still to the schematic diagram, the resonant inverter 120 includes a high DC voltage source 122, which is coupled in parallel with energy storage capacitor C11 and delivers input voltage Vin. The energy storage capacitor C11 is connected in parallel with the half bridge circuit defined by the two transistors or switches S11 and S12. In the exemplary embodiment, transistors or switches S11 and S12 are MOSFETs but may be other suitable power switching devices. Thus, the first terminal and the second terminal of the energy storage capacitor C11 are coupled to the drain of transistor or switch S11 and the source of transistor or switch S12, respectively. The source of transistor or switch S11 is coupled to the drain of transistor or switch S12 via half bridge output node A. The gates of transistors or switches S11 and S12 are coupled to an inverter control circuit (NOT SHOWN) to control the conducting and non-conducting states thereof.

The resonant inverter 120 further includes a DC blocking capacitor C12 having a first terminal coupled to the half bridge output node A and a second terminal coupled to a first terminal of inductor L11 of the main resonant filter. The main resonant filter is defined by inductor L11 and capacitor C13. The HID lamp 150 is coupled in parallel with capacitor C13. The negative terminal of the high DC voltage source 122, the second terminal of the energy storage capacitor C11, the source of transistor or switch S12, and the second terminal of capacitor C13 are tied together.

Figure 2:
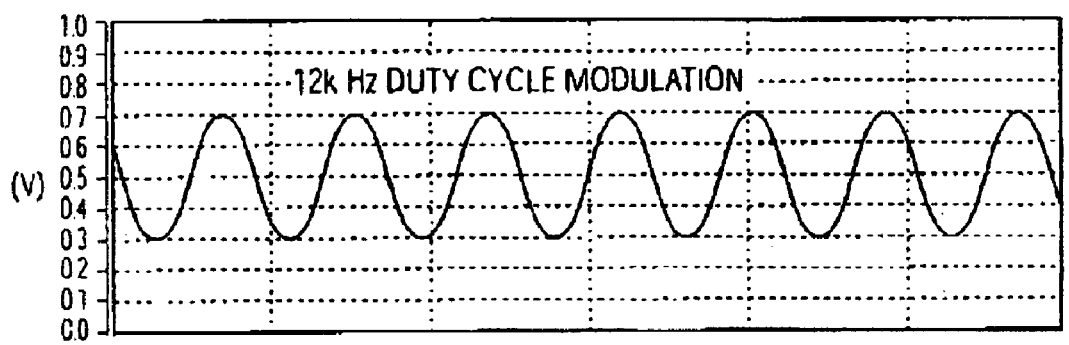
FIG. 2 illustrates the duty cycle modulation waveform of the present invention.
Figure 3:
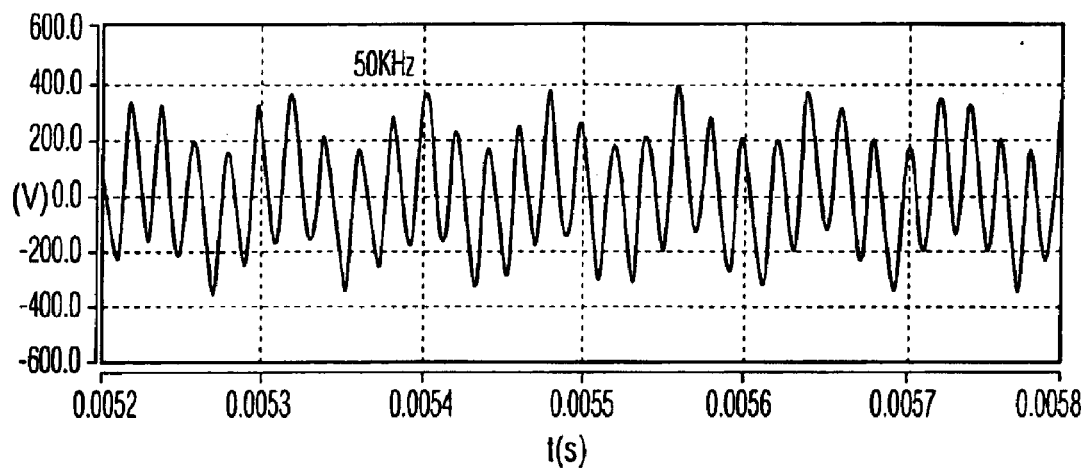
FIG. 3 illustrates the HID lamp voltage waveform over time of the present invention.
Figure 4:
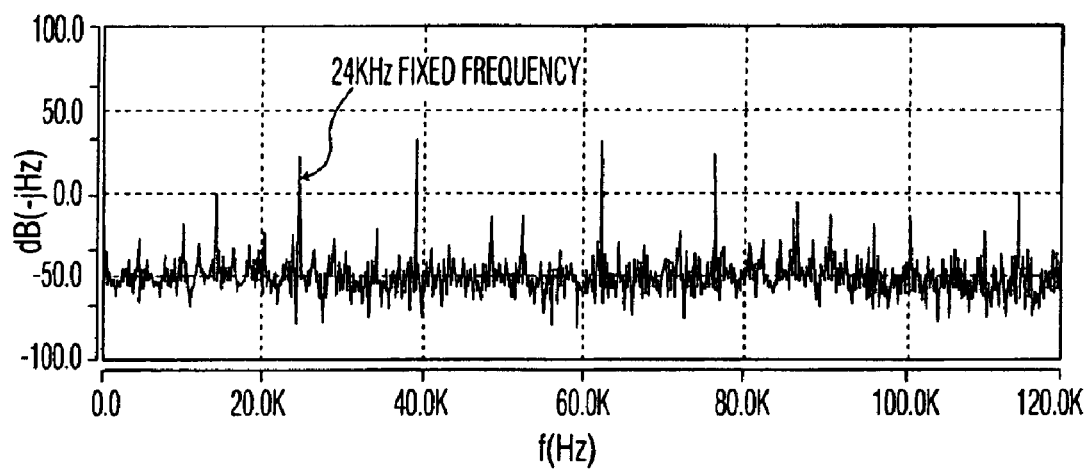
FIG. 4 illustrates the power spectrum waveform over a frequency spectrum of the present invention.

Referring now to FIGS. 2–4, the method of the present invention employing the resonant inverter 120 to achieve color mixing by excitation of the second longitudinal acoustic mode with arc stability and arc straightening will now be described in detail.

In order to achieve color mixing by excitation of the second longitudinal acoustic mode, the power to the HID lamp 150 must be modulated at the frequency of the second longitudinal acoustic mode. In the exemplary embodiment, the second longitudinal acoustic mode is approximately 24 kHz. The method of the present invention derives the necessary power modulation by modulating the duty cycle of transistors or switches S11 and S12. In general, the power to the load presented by the HID lamp 150 is at a maximum when the duty cycle is 50% or 0.5. As the duty cycle is decreased or, alternately, increased from 50%, the load power will decrease. Thus, the load power can be modulated simply by modulating the duty cycle appropriately so that it is increased and decreased about the nominal value.

To create a 24 kHz modulation of the load power, the duty cycle (DC) can be switched between 50% and 40% at a frequency of 12 kHz. Since the second longitudinal acoustic mode of the HID lamp 150 is 24 kHz, the load power will be modulated by a first amount. On the other hand, by varying the duty cycle (DC) between 50% and 30%, the load power will be modulated by a second amount wherein the second amount is larger than the first amount. As can be appreciated, the degree of excitation of the second longitudinal acoustic mode can be varied and controlled. Thus, modulating the duty cycle DC in a manner which varies the duty cycle DC accordingly, modulates the load power in a manner to excite the second longitudinal acoustic mode in the HID lamp 150 to achieve color mixing or, in other words, to minimize, if not eliminate, vertical segregation.

The duty cycle DC can be modulated with a sinusoidal function or other symmetrical waveform functions. Only one example of a modulated duty cycle will be described in detail since there are numerous modulation functions and to describe such functions is prohibitive. An exemplary sinusoidally modulated duty cycle ($DC_m$) can be expressed as $$DC_m = DC_n + a_m \sin(2*pi*fm*t) \quad \text{Eq.(1)}$$

wherein $DC_n$ is the nominal value of the duty cycle; $a_m$ is a modulation index; and $f_m$ is the modulation frequency. In the exemplary embodiment, the $DC_n$ is substantially 0.5 or 50%; the modulation index $a_m$ varies between 0 and 0.5; and the modulation frequency $f_m$ is set to substantially one-half (½) of the frequency of the second longitudinal acoustic mode. The modulation index $a_m$ controls the amount of power or degree of excitation in the HID lamp 150 at a frequency of twice the modulation frequency $f_m$.

In view of the foregoing, the above modulation function is only one suitable function which can be used to modulate the duty cycle to control the amount of power or degree of excitation of the HID lamp 150.

The duty cycle modulation creates a fixed frequency power component (24 kHz) in the HID lamp 150 that is independent of the driving frequency of the HID lamp 150 or, or in other words, the switching frequency of the half bridge circuit. Therefore, the actual switching frequency of the half bridge circuit (transistors or switches S11 and S12) can be varied over a high frequency range, for example, 100 KHz, without disturbing the fixed frequency power component (24 kHz) created by the duty cycle modulation to excite the second longitudinal acoustic mode. Thus, the HID lamp 150 can be driven at a frequency that is swept from 45 kHz to 55 kHz or other high frequency range in order to effectuate arc stability and arc straightening, while the duty cycle is modulated at 12 KHz in order to excite the second longitudinal acoustic mode of the HID lamp 150 at a fixed frequency of 24 kHz to effectuate color mixing.

In summary, the half bridge configured resonant inverter implementation is very efficient, simple and inexpensive. For a properly designed and operated inverter 120, transistors or switches S11 and S12 can, preferably, be switched at zero voltage which results in very low switching losses. Furthermore, the transistors or switches S11 and S12 are operated at the fundamental frequency of the HID lamp 150. If the lamp is driven at 50 kHz, then the switches are operated at 50 kHz and the transistors or switches S11 and S12 of the half bridge circuit are operated at a nominal 50 kHz. Thus, the switching frequency is much lower, which will further reduce switching losses, than prior implementations requiring 250 kHz in order to synthesize a 50 kHz waveform through pulse width modulation (PWM). Moreover, electromagnetic interference (EMI) will also be reduced.

In an exemplary example, the HID lamp 150 is operated at a nominal high frequency of approximately 50 kHz, wherein the driving frequency is swept over a high frequency range of 45 kHz to 55 kHz. FIG. 3 illustrates an exemplary swept lamp voltage waveform with a nominal high frequency of 50 kHz. The lamp voltage waveform is represented in volts (−600V to +600V) verses time in seconds (0.0052 to 0.0058 s). The modulation frequency $f_m$ is approximately 12 kHz at a depth of 0.2. In other words, the duty cycle varies from 0.3 (30%) or 0.7 (70%) around the nominal duty cycle $DC_n$ of 0.5 (50%), as best seen in FIG. 2. FIG. 2 illustrates an exemplary waveform of a sinusoidally modulated duty cycle ($DC_m$) with a modulation frequency $f_m$ of approximately 12 kHz. The waveform is represented as volts (0.0V to 1.0V) verses time in seconds. In operation, the 12 kHz duty cycle modulation of FIG. 2 creates a substantially 24 kHz frequency component in the load power spectrum, as best seen in FIG. 4. FIG. 4 illustrates the power spectrum of this exemplary example. The power spectrum waveform is represented as dB(−jHz) (−100 to +100) verses frequency in Hertz (0.0 to 120 k).

In view of the foregoing, for an exemplary HID lamp 150 with a second longitudinal acoustic mode at approximately 24 kHz, a fixed and controlled frequency excitation at 24 kHz may be used to excite acoustic resonances to create color mixing or, in other words, to minimize, if not eliminate, vertical segregation. Simultaneously, sweeping the driving frequency of the HID lamp 150 over a high frequency range, for example, 45 kHz to 55 kHz effectuates arc stability and arc straightening.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method for color mixing with arc stability and straightening of a high intensity discharge (HID) lamp:
   (a) driving the HIP lamp with a half bridge configured resonant inverter at a high frequency which is swept over a high frequency range to effectuate arc stability and arc straightening; and
   (b) modulating a duty cycle of the half bridge configured resonant inverter to effectuate power modulation at a frequency power component substantially equal to a frequency of a second longitudinal acoustic mode of the HID lamp, which effectuates color mixing along a vertical axis of the HID lamp.

2. The method according to claim 1, wherein the high frequency range is substantially 45 kHz to 55 kHz.

3. The method according to claim 1, wherein step (b) includes modulating the duty cycle at a modulation frequency which is equal to substantially one-half of the frequency of the second longitudinal acoustic mode.

4. The method according to claim 1, wherein step (b) includes modulating the duty cycle with a sinusoidal function.

5. The method according to claim 1, wherein the frequency power component is substantially 24 kHz and is independent of the high frequency driving the HID lamp.

6. The method according to claim 1, wherein the duty cycle has a nominal value of 50% and varies symmetrically about the nominal value plus or minus 20%.

7. A method for color mixing with arc stability and straightening of a high intensity discharge (HID) lamp:
   (a) driving the HIP lamp with a half bridge configured resonant inverter at a high frequency which is swept over a high frequency range to effectuate arc stability and arc straightening;
   (b) modulating a duty cycle of the half bridge configured resonant inverter with a function having a modulating frequency substantially equal to a one-half a frequency of a second longitudinal acoustic mode of the HID lamp; and
   (c) exciting the second longitudinal acoustic mode with the half bridge configured resonant inverter to effectuate color mixing along a vertical axis of the HID lamp.

8. The method according to claim 7, wherein the high frequency range is substantially 45 kHz to 55 kHz with a nominal frequency of 50 kHz.

9. The method according to claim 7, wherein the step (b) effectuates power modulation at a frequency power component equal to substantially the second longitudinal acoustic mode.

10. The method according to claim 9, wherein the frequency power component is substantially 24 kHz and is independent of the high frequency driving the HID lamp.

11. The method of claim 7, wherein the function is a sinusoidal function.

12. The method according to claim 7, wherein the duty cycle has a nominal value of 50% and varies symmetrically about the nominal value plus or minus 20%.

13. A half bridge configured resonant inverter for powering a high intensity lamp (HID) comprising:
   a half bridge circuit driving the HID lamp at a nominal high frequency over a swept switching high frequency range to effectuate arc stability and arc straightening and having a modulated duty cycle to effectuate power modulation to the HID lamp at a frequency which excites a second longitudinal acoustic mode of the HID lamp to achieve color mixing or reduction in vertical segregation along a vertical axis of the HID lamp; and
   a resonant filter coupled between the half bridge circuit and the HID lamp.

14. The inverter according to claim 13, wherein the modulated duty cycle has a modulation frequency which is equal to substantially one-half of a frequency of the second longitudinal acoustic mode.

15. The inverter according to claim 13, wherein the nominal high frequency is approximately 50 kHz and the high frequency range is substantially 45 kHz to 55 kHz.

16. The inverter according to claim 13, wherein the modulated duty cycle is modulated with a sinusoidal function.

17. The inverter according to claim 13, wherein the frequency of the power modulation is substantially 24 kHz and is independent of the nominal high frequency driving the HID lamp.

* * * * *